United States Patent
Chen et al.

(10) Patent No.: US 10,628,747 B2
(45) Date of Patent: Apr. 21, 2020

(54) COGNITIVE CONTEXTUAL DIAGNOSIS, KNOWLEDGE CREATION AND DISCOVERY

(71) Applicant: International Business Machines Corporation, Armonk, NY (US)

(72) Inventors: Hao Chen, Beijing (CN); Shao C. Li, Beijing (CN); Qi C. Li, Beijing (CN); Jie Ma, Nanjing (CN); Li J. Mei, Beijing (CN); Xin Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 15/431,023

(22) Filed: Feb. 13, 2017

(65) Prior Publication Data
US 2018/0234303 A1    Aug. 16, 2018

(51) Int. Cl.
| G06F 15/16 | (2006.01) |
|---|---|
| G06N 5/02 | (2006.01) |
| H04L 12/24 | (2006.01) |
| H04L 29/08 | (2006.01) |

(52) U.S. Cl.
CPC ............ *G06N 5/022* (2013.01); *H04L 41/16* (2013.01); *H04L 67/12* (2013.01)

(58) Field of Classification Search
USPC ........................................................ 709/217
See application file for complete search history.

(56) References Cited

U.S. PATENT DOCUMENTS

| 7,409,317 | B2 * | 8/2008 | Cousin | G05B 23/0248 |
|---|---|---|---|---|
| | | | | 702/183 |
| 7,584,074 | B2 * | 9/2009 | Cousin | G05B 23/0248 |
| | | | | 702/183 |
| 7,698,104 | B2 * | 4/2010 | Cousin | G06F 11/2257 |
| | | | | 702/183 |
| 7,917,570 | B2 * | 3/2011 | Ishii | G08C 17/00 |
| | | | | 709/200 |
| 8,195,342 | B2 * | 6/2012 | Anderson | G05D 1/0088 |
| | | | | 700/253 |

(Continued)

FOREIGN PATENT DOCUMENTS

| EP | 3007020 A1 | 4/2016 |
|---|---|---|
| WO | 2016033985 A1 | 3/2016 |

(Continued)

OTHER PUBLICATIONS

Wollenhaupt, Gary; Product Lifecycle Report: "IoT Slashes Downtime With Predictive Maintenance"; 2016; 1-6 pages.

(Continued)

*Primary Examiner* — Alicia Baturay
(74) *Attorney, Agent, or Firm* — Cantor Colburn LLP; Joseph Petrokaitis

(57) ABSTRACT

Aspects of the present invention include a method, which includes receiving, by a processor, data from one or more communicatively coupled objects associated with a device. The method further includes providing, by the processor, context information to the received data. The method further includes mapping, by the processor, the context information associated with the received data to one or more nodes of a knowledge graph. The method further includes diagnosing, by the processor, a problem with the device, based on knowledge graph information.

13 Claims, 9 Drawing Sheets

(56) References Cited

U.S. PATENT DOCUMENTS

| | | | | |
|---|---|---|---|---|
| 8,321,365 | B2* | 11/2012 | Anderson | G06N 5/02 |
| | | | | 706/46 |
| 8,560,145 | B2* | 10/2013 | Anderson | G06N 5/043 |
| | | | | 701/1 |
| 8,935,059 | B2* | 1/2015 | Blank | A01B 79/005 |
| | | | | 701/50 |
| 9,135,208 | B1* | 9/2015 | Huang | G06F 15/16 |
| 9,188,980 | B2* | 11/2015 | Anderson | G05D 1/0077 |
| 9,292,832 | B2* | 3/2016 | Goel | H04W 4/08 |
| 9,900,172 | B2* | 2/2018 | Goel | H04W 4/70 |
| 9,953,081 | B2* | 4/2018 | Gomadam | G06F 16/9024 |
| 9,953,082 | B2* | 4/2018 | Gomadam | G06F 16/353 |
| 2008/0140348 | A1* | 6/2008 | Frank | G06Q 10/06 |
| | | | | 702/181 |
| 2016/0111916 | A1 | 4/2016 | Prakash et al. | |
| 2017/0351764 | A1* | 12/2017 | Osotio | G06F 16/9535 |
| 2018/0032890 | A1* | 2/2018 | Podgorny | G06F 16/951 |
| 2018/0052915 | A1* | 2/2018 | Cohn | G06F 16/3344 |
| 2018/0114140 | A1* | 4/2018 | Chen | G06N 20/00 |
| 2018/0129941 | A1* | 5/2018 | Gustafson | G06N 5/02 |
| 2018/0129959 | A1* | 5/2018 | Gustafson | G06N 5/022 |
| 2018/0137424 | A1* | 5/2018 | Gabaldon Royval | G06N 5/04 |
| 2018/0293303 | A1* | 10/2018 | Singh | G06F 16/2425 |

FOREIGN PATENT DOCUMENTS

| | | | | |
|---|---|---|---|---|
| WO | | 2016054605 A2 | 4/2016 | |
| WO | WO-2016191133 A1 * | | 12/2016 | G06F 16/2425 |

OTHER PUBLICATIONS

In Collaboration with Accenture; Industrial Internet of Things: "Unleashing the Potential of Connected Products ans Services"; World Economic Forum; Jan. 2015; 1-40 pages.

Schad & IBM Watson IoT Improve Toyota's Maintenance Efficiency & Equipment Reliability; http://reliabilityweb.com/news/article/schad-ibm-watson-iot-improve-toyotas-maintenance-efficiency-equipment-relia; Aug. 1, 2016; 1-5 pages.

* cited by examiner

COGNITIVE CONTEXTUAL DIAGNOSIS, KNOWLEDGE CREATION AND DISCOVERY

BACKGROUND

The present invention relates in general to cognitive, contextual technology, and more specifically, to cognitively providing context for information generated by devices in an IoT configuration. IoT refers to a system of communicatively coupled devices and various types of objects—all of which can be assigned an IP address and communicate data and information over a network.

SUMMARY

One embodiment of the present invention is a computer-implemented method, which includes receiving, by a processor, data from one or more communicatively coupled objects associated with a device. The method further includes providing, by the processor, context information to the received data. The method further includes mapping, by the processor, the context information associated with the received data to one or more nodes of a knowledge graph. The method further includes diagnosing, by the processor, a problem with the device, based on knowledge graph information. Other embodiments of the present invention include a system and a computer program product.

Additional features and advantages are realized through the techniques of the present invention. Such additional features and advantages as well as other embodiments and aspects of the invention are considered a part of the claimed invention. The subject matter which is regarded as the invention is particularly pointed out and distinctly claimed in the claims at the conclusion of the specification.

BRIEF DESCRIPTION OF THE DRAWINGS

The foregoing and other features and advantages of the invention are apparent from the following detailed description taken in conjunction with the accompanying drawings, in which.

DETAILED DESCRIPTION

Figure 1:
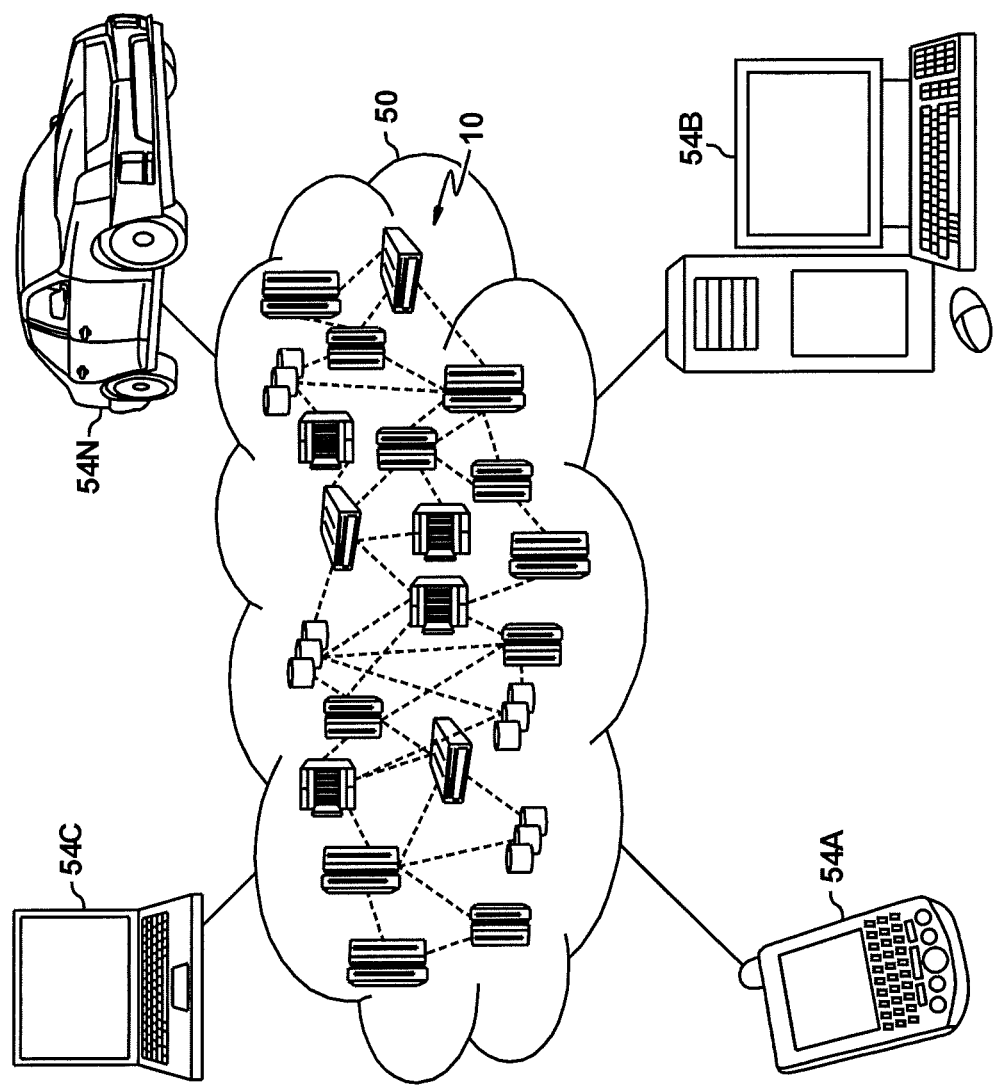
FIG. 1 depicts a cloud computing environment according to one or more embodiments of the present invention.

It is understood in advance that although this detailed description includes a description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

By way of overview to technologies that may be more specifically relevant to aspects of the present invention, in a typical IoT configuration the various sensors associated with computers, machines and/or objects communicatively coupled in the IoT configuration each provides a stream of largely unstructured data. As such, this data cannot be easily understood (and thus cannot be effectively and efficiently utilized) by other devices within the IoT configuration or by existing problem diagnosis systems and methods.

In many technical areas (e.g., automotive, industrial, home, electronics), products/devices in those areas (e.g., cars, manufacturing devices, washing machines, computers) should be serviced and maintained for proper usage and functioning. Typically, product knowledge is leveraged and used to support such service and maintenance, to provide more effective customer service. However, such product knowledge can consist of unstructured information or a "hybrid" (e.g., combination or aggregation) of unstructured and structured information. For example, such information could include written materials (e.g., product service manuals, user manuals, product maintenance records, equipment profiles and/or data). The available information can also include product knowledge of a subject matter expert (SME)—for example, a trained technician or service person having experience working with a particular product. These are examples of unstructured data or information. Such unstructured types of product knowledge can have limitations and make it relatively difficult to adequately provide prompt, effective, accurate and low cost service and maintenance support. In contrast, some of the materials may exist in electronic form and be stored in a database (an example of structured data). It will be understood by one of (at least ordinary) skill in the art, that some embodiments of the present invention enable one or more industry/domain-specific maintenance solutions to the foregoing.

Referring now to FIG. 1, an example cloud computing environment according to one or more embodiments of the present invention is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device.

It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser). In some embodiments, the device can be a car 54N, which can include other devices and/or objects (see e.g., 308, FIG. 5) that are (or include) sensors adapted for detecting and communicating/sharing information associated with other devices/objects and/or the car. Examples of the foregoing and other aspects of the invention will be discussed in more detail (and/or with more specifics) below.

Figure 2:
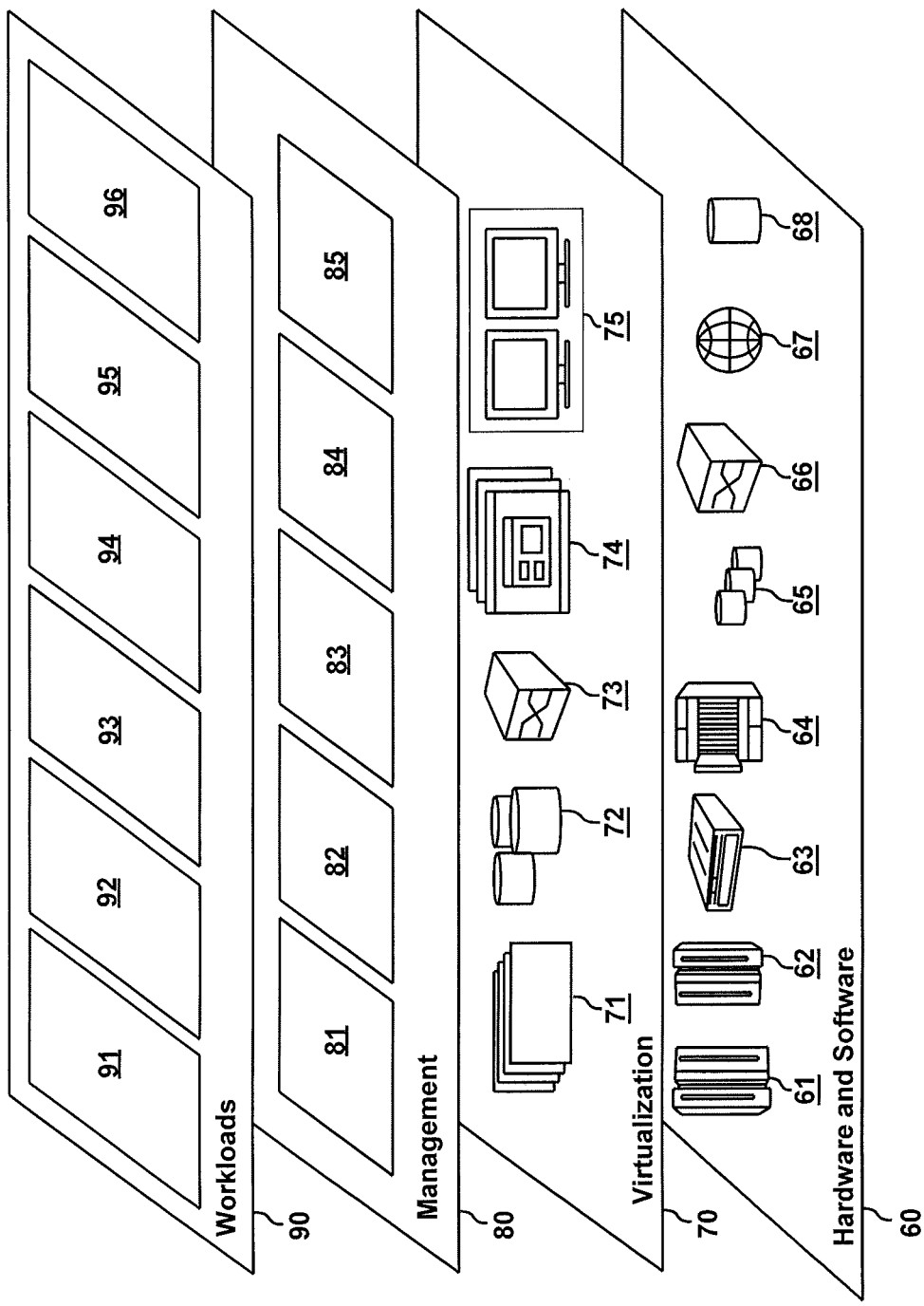
FIG. 2 depicts abstraction model layers according to one or more embodiments of the present invention.

Referring now to FIG. 2, a set of functional abstraction layers provided by cloud computing environment 50 (FIG. 1), according to one or more embodiments of the present invention, is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and a method 96, in accordance with one or more embodiments of the present invention. Some (non-limiting) examples of workloads, functions and methods will be discussed in more detail with reference to FIG. 4 et. seq.).

Figure 3:
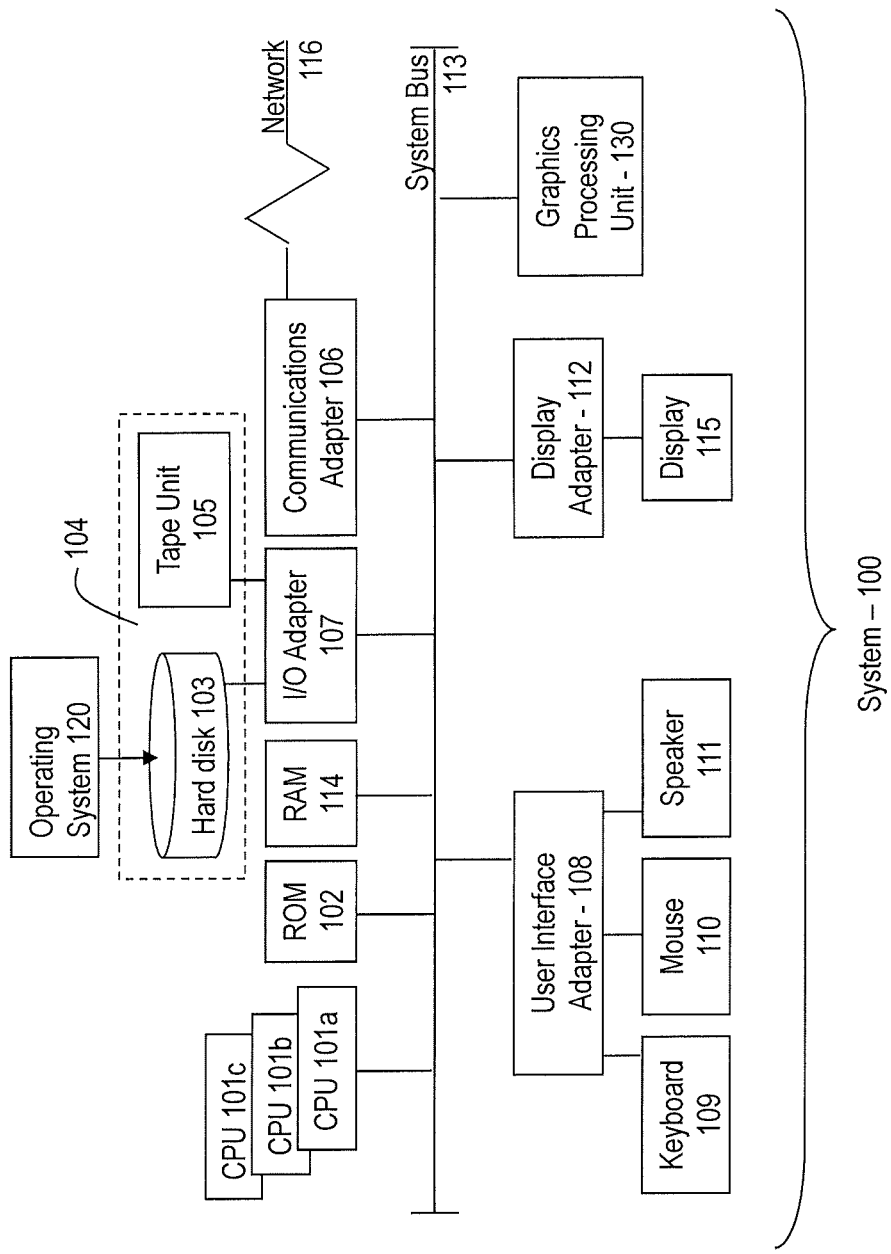
FIG. 3 is a block diagram illustrating one example of a system according to one or more embodiments of the present invention.

FIG. 3 depicts an exemplary system 100 according to one or more embodiments. As depicted, system 100 has one or more central processing units (CPUs) 101a, 101b, 101c, etc. (collectively or individually referred to as processor(s) 101). In some embodiments, processor(s) 101 can include a reduced instruction set computer (RISC) microprocessor. Processors 101 are coupled to system memory (e.g., RAM) 114 and various other components via a system bus 113. Read only memory (ROM) 102 is coupled to the system bus 113 and can include a basic input/output system (BIOS) (not depicted), which controls certain basic functions of system 100.

FIG. 3 further depicts an input/output (I/O) adapter 107 and a network adapter 106 coupled to the system bus 113. I/O adapter 107 can be a small computer system interface (SCSI) adapter that communicates with a hard disk 103 and/or tape storage drive 105 or any other similar component. Hard disk 103 and tape storage device 105 are collectively referred to herein as mass storage 104. Operating system 120 for execution on the processing system 100 can be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which can include a graphics adapter to improve the performance of graphics intensive applications and a video controller. In one embodiment, adapters 107, 106, and 112 can be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108. A keyboard 109, mouse 110, and speaker 111 all interconnected to bus 113 via user interface adapter 108, which can include, for example, a Super I/O chip integrating multiple device adapters into a single integrated circuit.

System 100 can also include a graphics processing unit 130. Graphics processing unit 130 is a specialized electronic circuit designed to manipulate and alter memory to accelerate the creation of images in a frame buffer intended for output to a display. In general, graphics processing unit 130 is more efficient at manipulating computer graphics and image processing than general-purpose CPUs, and can have a highly parallel structure that can make it more effective than general-purpose CPUs for processing of large blocks of data in parallel.

Thus, as depicted configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

By way of further overview, some embodiments of the present invention enable an industry/domain-specific maintenance solution. Some embodiments of the present invention (methods, systems, and computer program products) are described with respect to supporting cognitive and contextual problem diagnosis knowledge creation for enhanced problem diagnosis and maintenance through communicatively coupled (IoT) devices and objects (devices and objects also referred to as "objects"). In some embodiments, context or meaning is provided to raw data or information from sensors associated with devices and objects in an IoT configuration. In some embodiments, one or more contextual engagement components (an example of which will be described with reference to FIG. 5) facilitate problem diagnosis. In some embodiments, one or more contextual mapper components (an example of which will be described with reference to FIG. 8) link together or generate relationships between IoT contexts and problem diagnosis knowledge graphs. An example of a knowledge graph will be described with reference to FIG. 7. In some embodiments, a cognitive contextual-based dialog process is enhanced by extracting missing IoT context node information and adding the missing node(s) information to the knowledge graph, e.g., at runtime.

Figure 4:
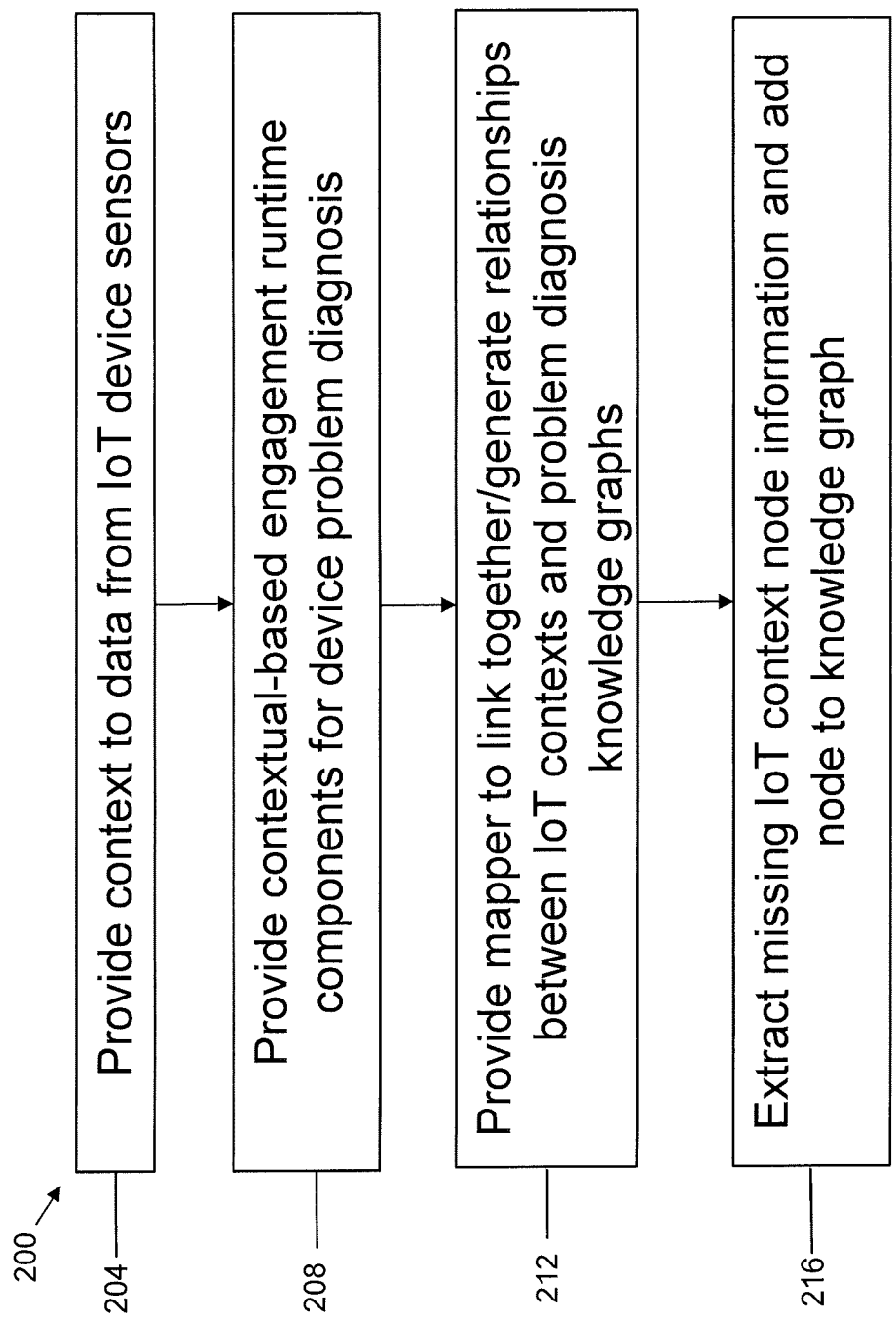
FIG. 4 is a flow diagram of a method in accordance with one or more embodiments of the present invention.

FIG. 4 illustrates an exemplary computer-implemented method 200 according to one or more embodiments of the present invention. Some embodiments support IoT device cognitive and contextual problem diagnosis knowledge creation for enhanced problem and maintenance solutions for IoT communicatively coupled devices and objects.

Some embodiments of the present invention are described with respect to the flow diagram of FIG. 4. However, some aspects of such embodiments are described in greater detail elsewhere in this detailed description, such as with respect to other figures.

Referring now specifically to FIG. 4, in block 204, one or more sensors associated with various devices and objects communicatively coupled together in an Internet of Things (IoT) configuration, provide data associated with one or more related devices and objects. Regarding block 204, in a typical IoT configuration (see e.g., 304, FIG. 5) some (or even all) of the various sensors associated with computers, machines and/or objects communicatively coupled in the IoT configuration provide a stream of largely unstructured data, which can lack context or meaning that would make it useful (e.g., context with regard to the current status of a device or object in an IoT or other configuration). Thus, it would be beneficial that some degree of context or meaning is provided (where appropriate) with the sensor data. For example, such context could allow other devices within the IoT configuration to derive or generate useful insight from the sensor data and take appropriate action (e.g., make decisions autonomously). Therefore, in block 204, context is added to, supplemented with, or provided to the sensor data.

In some embodiments of the present invention, the sensor data can be supplemented or provided with associated context through use of analytics techniques, such as, for example and without limitation, machine learning, cognitive analysis, ontology model-based mining, statistical analysis, and time-series analysis. In some embodiments, not only is context provided for sensor data, but also other (possibly more relevant) sensor data is identified from among the entirety of the data. The various exemplary analytics techniques can also be useful in this aspect.

Figure 5:
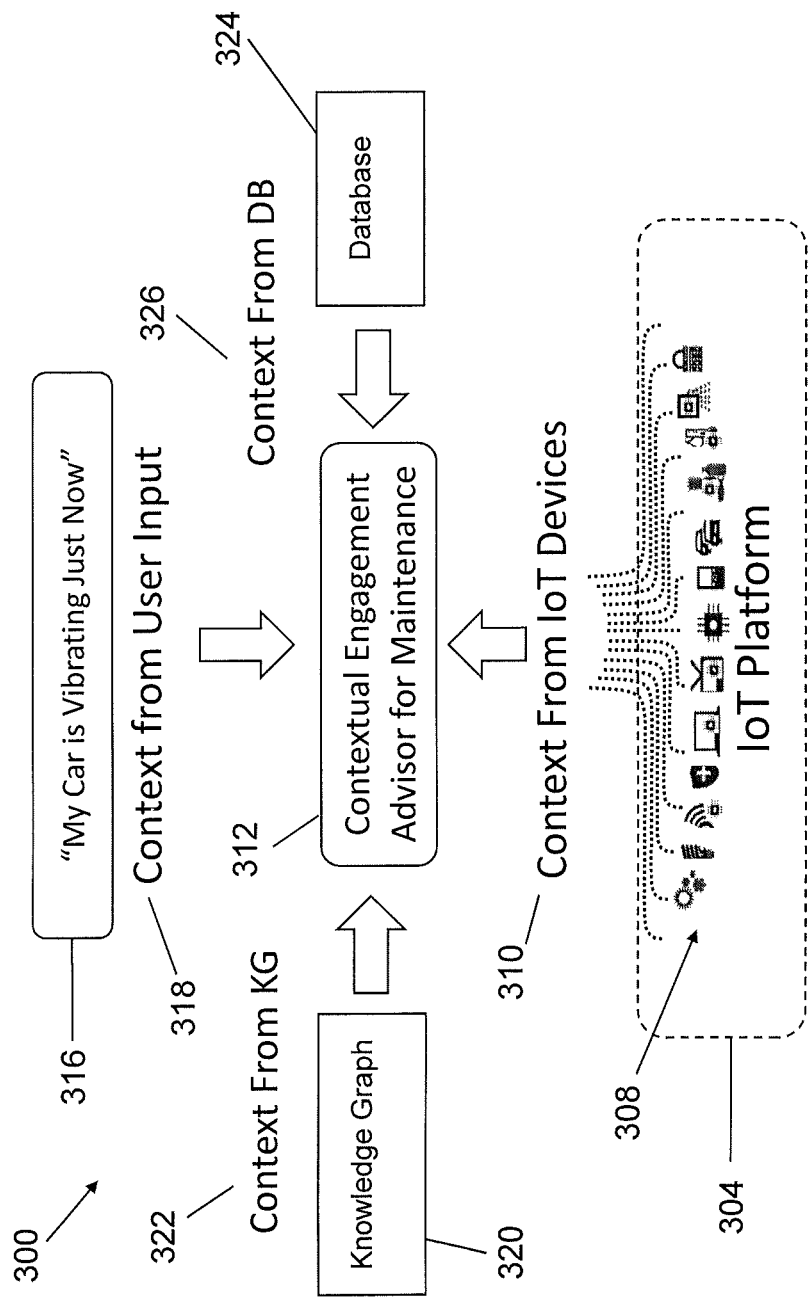
FIG. 5 is a block diagram of contextual engagement components in accordance with one or more embodiments of the present invention.

In block 208, (one or more) contextual-based engagement components for device problem diagnosis are provided, which can be executed at runtime. With reference also now to FIG. 5, a more detailed example of the contextual-based engagement runtime components in accordance with one or more embodiments of the present invention will be described.

Referring again to FIG. 4, in block 212, a mapper to link together or generate relationships between IoT contexts to problem diagnosis knowledge graphs can be provided.

In block 216, in an optional operation, a cognitive contextual-based procedural dialog can be enhanced by extracting or identifying missing IoT context node information and adding the node(s) (or additional information to existing node(s)) to the knowledge graph, e.g., at runtime—as described in more detail hereinafter with respect to FIG. 7.

In some embodiments, the method 200 (FIG. 4) is implemented as software executed by one or more computer elements (also referred to as modules) associated with and/or located within a "network cloud" (such as the examples described above with reference to FIGS. 1 and 2). In some embodiments, the computer elements can reside on a system, such as the system 100 described above with reference to FIG. 3. Some embodiments may implement some combination of the foregoing (e.g., systems, environments, software), now known or hereinafter created.

FIG. 5 depicts a number of exemplary context-based engagement components, in accordance with one or more embodiments of the present invention. As depicted, FIG. 5 includes an IoT platform 304, which includes a plurality of devices and/or objects 308 communicatively coupled together in an IoT configuration. This example assumes a network environment (not depicted), such as an intranet, internet, or world wide web (WWW or Web) embodiment. By way of overview and example (only), a common characteristic of such device(s) and/or objects 308 in a network environment is that they can be assigned an internet protocol (IP) address and can communicate data and information over the network. In some embodiments, such devices and/or objects 308 provide unstructured (raw) data, (at least some of which) lacks context. In some embodiments, the devices and/or objects 308 can provide such context 310, e.g., through the example method described with reference to FIG. 4 (e.g., the various analytics techniques). Other devices or objects in the IoT configuration 308 can already provide context 310 or meaningful data or information.

With reference again to FIG. 5, context 310 from the devices and objects 308 in the IoT platform 304 is provided to contextual engagement adviser (CEA) 312 for problem diagnosis for one of the devices or objects in the configuration 308. In some embodiments, CEA 312 is a software module, for example, running on one or more processors 101 (FIG. 3) or in a "cloud" such as is described with reference to FIG. 1 and FIG. 2.

As depicted in FIG. 5, CEA 312 can receive contextual as well as unstructured (raw) input from the devices and objects 308 and other sources, such as knowledge graph (KG) 320, database (DB) 324 and/or from a user device 316. For example, a user (not depicted) may provide contextual info/input 318—manually or verbally via a computer, smartphone (e.g., 54A . . . 54C of FIG. 1), or by some other device/method. Such user context 318 might provide details on the problem or symptom the user currently perceives as being experienced by the car (e.g., 54N of FIG. 1). For example, the information might describe the car as vibrating or shaking.

Alternatively (or in addition), contextual (and other information (not depicted)) 322 may also be provided to CEA 312 from knowledge graph 320. The knowledge graph 320 can be built using, e.g., a toolkit, from (unstructured) data provided by a subject matter expert (SME) or domain expert; that is, a person who has knowledge from working on the device or object at issue (e.g., a car) can be transformed into readily available information. The knowledge graph 320 can also include other unstructured data, such as information from service manuals or other documents relating to device, such as a car. As described in greater detail hereinafter with respect to FIG. 7, the knowledge graph 320 can include a number of interconnected nodes which describe the various paths for solving various problems with a device, such as a car. That is, knowledge graph 320 can contain a wealth of problem diagnosis information and can be considered to be a problem diagnosis model.

Alternatively (or in addition), contextual input 326 may be provided to CEA 312 from a database (DB) 324 that stores (structured) data or information about the device (e.g., car 54N of FIG. 1) and/or IoT object(s) 308. For example, the information stored in database 324 might include various (general or specific) manuals (e.g., user manuals, service manuals 412, FIG. 4) and/or maintenance records for a specific make and model of car and/or for the specific car at issue, which might be identified by its vehicle identification number (VIN).

In some embodiments, one or more of the information sources, 316, 320, 324 are physically external to the device but are operably coupled (e.g. via a wired connection (such as USB)) or a wireless connection (such as GPS, WiFi or Bluetooth technology) to the device.

In some embodiments of the present invention, CEA 312 can provide virtual service advisor (or agent) with the ability to leverage IoT context to expedite problem determination and resolution. As such, CEA 312 functions as an "IoT context creator" (see 604, FIG. 8).

Some embodiments of the present invention provide for collection of contextual information from objects, e.g., sensors that are communicatively coupled in an IoT configuration 308 and/or other sources. Some (non-limiting) examples of cognitive extraction, combined, annotation and/or analysis of contextual information from various sources and applications thereof will be described below. By way of further example, contextual information can become a (or supplement an existing) knowledge base and/or expedite the diagnosis and/or resolution of a problem.

Figure 6:
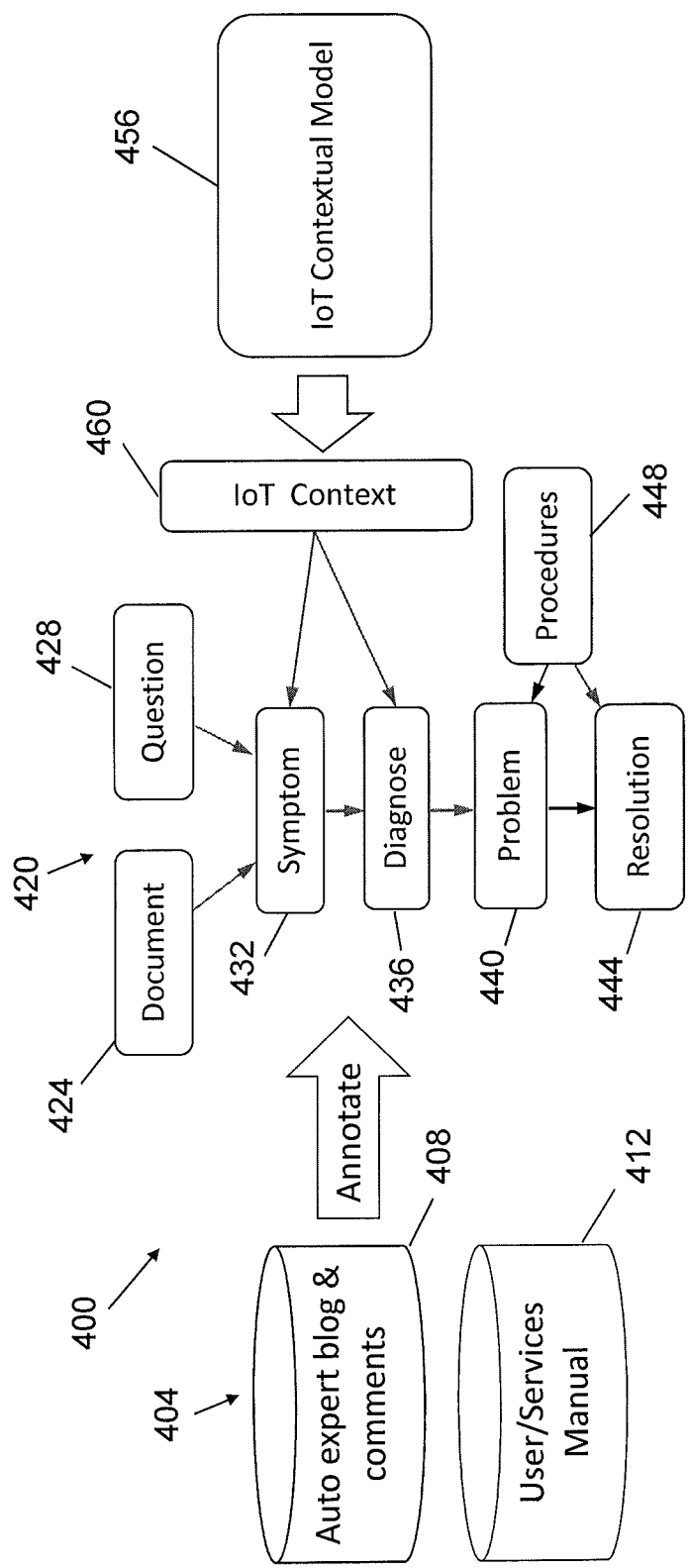
FIG. 6 is a block diagram of a cognitive contextual model in accordance with one or more embodiments of the present invention.

FIG. 6 depicts an example of a cognitive IoT contextual problem determination model 400, in accordance with one or more embodiments of the present invention. As depicted, the model 400 includes one or more data stores/sources 404 (e.g., auto expert blog 408, user/services manual 412). The data stores 404 can contain documents that can be annotated to extract or determine various symptoms or problems with a car (or some other communicatively coupled device or object in the IoT configuration 308 of FIG. 5). For example, with reference to FIG. 5, contextual input to CEA 312 indicated that the car was vibrating, shaking or shuddering. Thus, the possible exemplary symptoms of vibration, shaking or shuddering can be determined to occur during acceleration of the car or at certain speeds of the car.

In block 420, problem diagnosis may be performed based on input information e.g., annotated documents 424. In some embodiments, such problem diagnosis can be supplemented based on input (e.g., question(s) 428 extracted from sources 404, or input to the system 400 by a user or service provider). In blocks 432 and 436, symptom(s) are derived and a diagnosis is performed. In blocks 440 and 444, a possible problem and resolution are provided.

In some embodiments, in block 448, additional procedures are utilized to assist in the overall problem diagnosis and resolution process of 420. For example, for the car shaking and with the car accelerating, a possible diagnosis can be that one of more of the spark plugs and/or the associated spark plug wires can be faulty. In the alternative, for the car shaking or vibrating while being driven at certain speeds, a possible diagnosis is that the tires/wheels are not balanced or that one or more tires are out of round.

In some embodiments, an IoT contextual model 456 can provide information used in the problem diagnosis process 420. An example of the generation of an IoT contextual model 456 is described with references to FIG. 9. In some embodiments, the IoT model 456 provides context 460 to the problem diagnosis process 420 which is then utilized as inputs to steps 432 and 436 to better identify problems 440. In some embodiments, IoT model 456 outputs IoT context 460 that is then provided as input to various operations of problem diagnosis logic flow 420. The IoT context 460 can relate to the sensors within the various devices and objects communicatively coupled together in the IoT configuration 308 (FIG. 5).

An example of how the IoT contextual model 456 can be generated will be described with reference to FIG. 9. In some embodiments, IoT context 460 provided by IoT model 456 can answer questions such as "Where/How," "Which," "What," and "When", with respect to raw data generated by sensor(s) in the IoT configuration 308 and the relationship of the data to problem diagnosis and solution with respect to a specific device or object (e.g., a car) in the IoT configuration 308 (FIG. 5). These questions are also related to the knowledge graph 320 of FIG. 7. The "Where/How" context information question is oftentimes missing, related to the insufficiency of the raw data from the sensors. However, adding "missing" context information to the raw sensor data in accordance with the present invention can often answer the "Where/How" question. This is described in more detail with respect to the knowledge graph 320 of FIG. 7. The "Which" question relates to which component of the device (e.g., car) that can be faulty and thus causing a problem. The "What" question relates to what can have happened to have caused the problem. The "When" question relates to when did the problem first occur or exhibit symptoms (e.g., when did the car start vibrating or shaking?).

Figure 7:
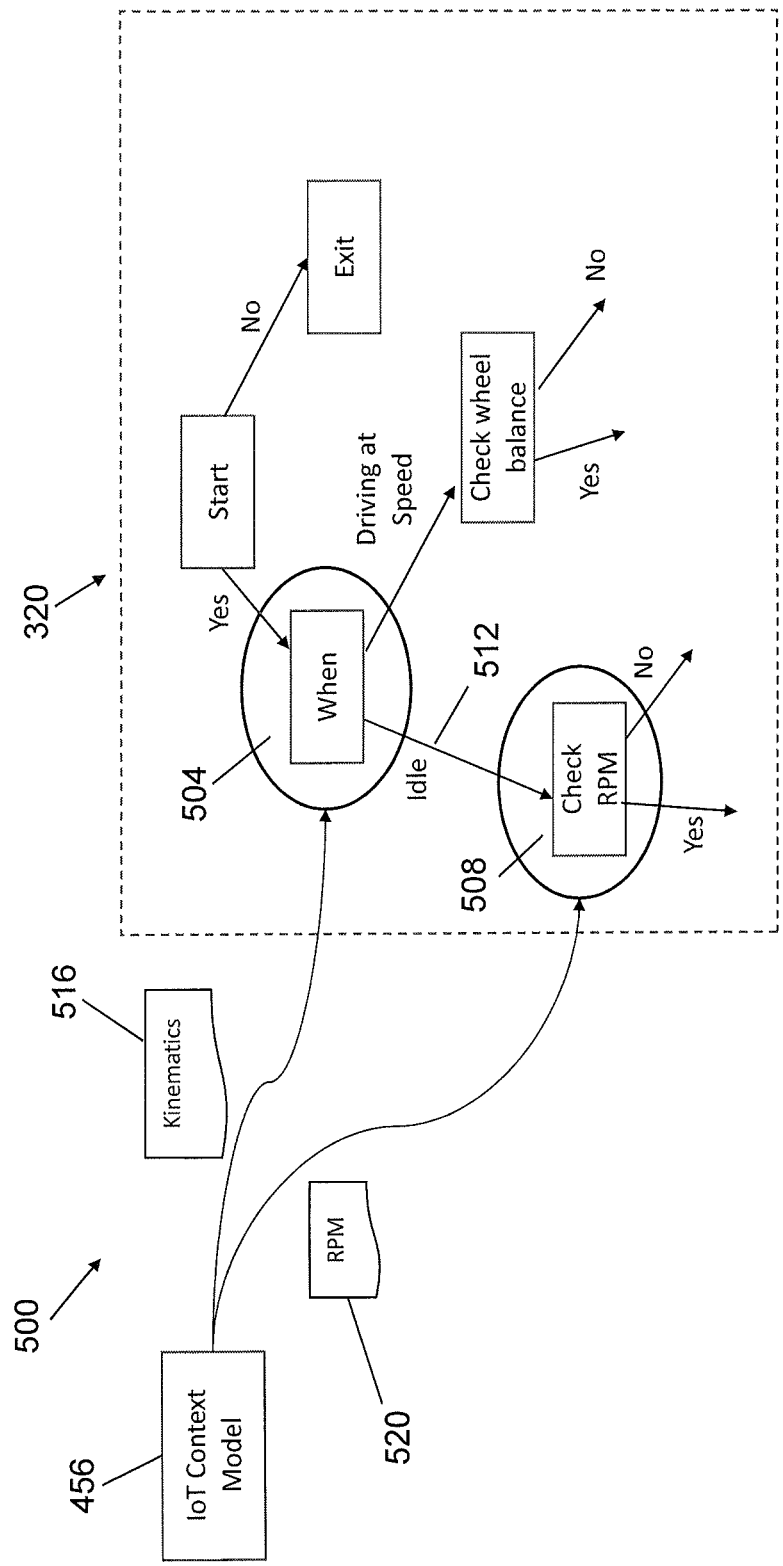
FIG. 7 depicts an example of a knowledge graph in accordance with one or more embodiments of the present invention.

FIG. 7 depicts a diagram 500 of an exemplary portion of a knowledge graph 320 (FIG. 5). For clarity and ease of understanding, only a portion of the knowledge graph 320 is shown in FIG. 7. It should be understood that the actual knowledge graph 320 can be much larger than that shown in FIG. 7. By way of example and for ease of understanding (only), the example described with respect to FIG. 7 depicts the knowledge graph 320 in the context of an embodiment of a car having a vibration, shaking or shuddering problem.

As depicted, knowledge graph 320 contains a number of nodes 504, 508 that relate to various steps to take in diagnosing and fixing the vibrating or shaking problem with the car. For example, each of the nodes in the knowledge graph 320 can contain information adequate enough to answer the questions "Where/How," "Which," "What," and "When" with respect to the problem diagnosis and resolution process (420, FIG. 6) for a certain one of the devices and/or objects in the IoT configuration 308 (FIG. 5). In addition, the various nodes 504, 508 in the knowledge graph 320 are connected by paths 512 that describe conditions that can exist or steps that can have been taken in diagnosing the problem with the car.

Node 504 is adapted to help determine when the vibration problem started occurring. A path 512 labeled "Idle" is followed when the problem started occurring with the car idling, which leads to the node 508 where a user (e.g., a service technician) is instructed to check the RPM of the car.

In FIG. 7, the two nodes 504, 508 can be provided with context (e.g., 516, 520) provided by the IoT contextual model 432. A more detailed example of an IoT contextual model was described above with reference to FIG. 6 (see e.g., 456). That is, IoT contextual the model 456 can provide additional context or information to those nodes 504, 508 in which the information is "missing" or inadequate to be properly utilized in the problem diagnosis and resolution process (420, FIG. 6). For example, context provided to node 504 might relate to kinematics 516 of the car, while context related to the RPM values 520 of the car can be provided to node 508. In some embodiments, FIG. 7 illustrates a more detailed example of step 216 (of FIG. 4) by which the cognitive contextual-based procedural dialog process can be enhanced by extracting missing or inadequate IoT context node information and adding the node(s) information to the knowledge graph 320, e.g., at runtime.

FIG. 7 thus illustrates an example of how IoT contextual (model) information can be combined with domain knowledge-based graphs to improve a problem diagnosis process. It also shows how some embodiments of the present invention can use and focus on knowledge-based problem diagnosis.

Figure 8:
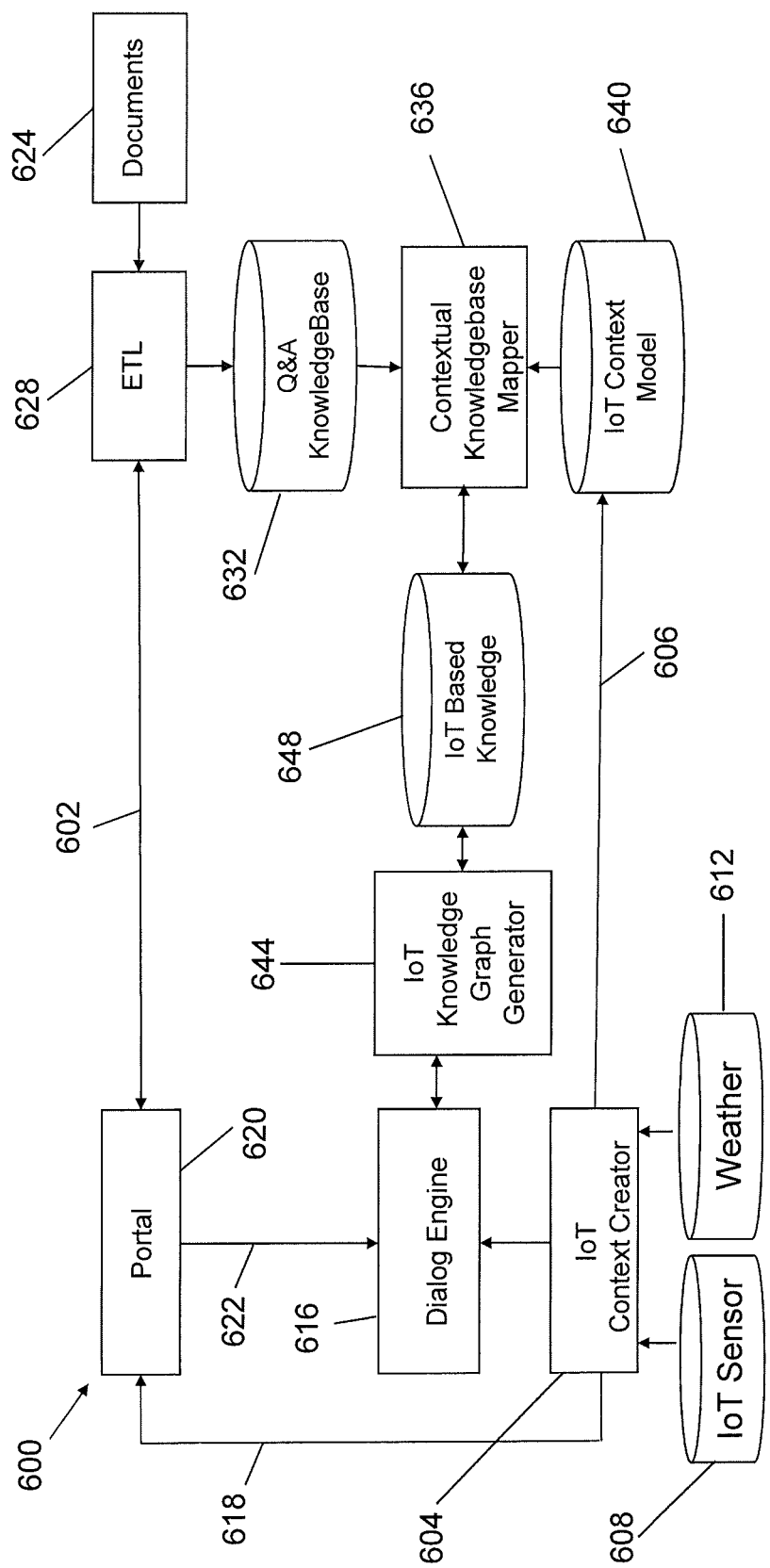
FIG. 8 is a block diagram of an architecture in accordance with one or more embodiments of the present invention.

FIG. 8 depicts an embodiment of architecture 600 in accordance with the present invention. In some embodiments, one or more components of architecture 600 are adapted to support IoT device cognitive and contextual problem diagnosis knowledge creation for enhanced problem and maintenance solutions for communicatively coupled IoT objects, such as the method 200 depicted in FIG. 4. In some embodiments, one or more components of architecture 600 are implemented in software. Communication between components of architecture 600 can be bidirectional (e.g., as indicated by "double-headed" connections—602 for example) or unidirectional (e.g., as indicated by "single-headed" connections—606 for example).

As depicted, architecture 600 includes an IoT context creator 604. In some embodiments, the IoT context creator 604 can be similar to CEA 312 previously described with reference to FIG. 5. The IoT context creator 604 receives information contained in one or more data stores (see e.g., 608, 612). The information can include unstructured (raw) data that is provided (streamed) from associated devices and/or objects communicatively coupled, e.g., in an IoT configuration 308 (FIG. 5). The information may also include data or information associated with and/or obtained from external sources, such as weather information in data store 612. IoT context creator 604 can create context and/or associate context (as appropriate) with related information received from data stores 608, 612 and or other sources (not depicted).

Referring again to FIG. 8, the IoT context creator 604 provides output to dialog engine 616. In some embodiments, IoT context creator 604 checks the status of the IoT context information provided to dialog engine 616 and makes appropriate corrections or adjustments thereto. In some embodiments, the IoT context information is provided in real time to dialog engine 616. In such real time embodiments, "real time" refers to the IoT context creator 604 receiving the raw data streams in real time and then providing the added context information to the raw data also in real time. The resulting real time context information can then be provided to the dialog engine 616.

IoT context creator 604 can provide information associated with a device or object communicatively coupled within the IoT configuration 308. This information can be provided on a path 618 to a portal 620. In some embodiments, portal 620 can act as (and/or be part of) a user interface component of a user device (not depicted) accessible by a user (not depicted). User Information can be provided on a path 622 to dialog engine 616 via portal 620. In some embodiments, communications can effectively be a "conversation" (or dialog) via the portal 620 based on additional information provided by IoT context creator 604. In an embodiment, the dialog can relate to the diagnosis of a problem with a device, e.g., the car.

In some embodiments, portal 620 can include various other functions and components (not depicted) that can facilitate determination of the cause of the fault information through a dialog carried out via portal 620. For example, the portal 620 can include an anomaly filter, a dialog map and a dialog frontend. The portal 620 may output a dialog start point to the dialog engine 616.

In this example, IoT context creator 604 provides information (to portal 620) relating to an abnormality of a sensor (fault information) associated with a device or object communicatively coupled within IoT configuration 308 (FIG. 5). Architecture 600 can also access various (internal or external) documents 624 in the problem diagnosis process. Documents 624 can include user manuals, service manuals, service records, etc. (see e.g., FIG. 5, 404).

Referring again to FIG. 8, documents 624 can be provided to an Extract, Transfer, Load (ETL) 628 function that parses relevant data and information from documents 624. In some embodiments, the ETL 628 function can include "deep learning" capabilities.

The ETL function 628 can provide parsed/extracted document information to portal 620, and can also receive information from the portal 620, e.g., questions from a user device (not depicted). The ETL function 628 may also provide the parsed document information to a question and answer (Q&A) knowledge base in data store 632. In some embodiments, the parsed document information can be considered to be a beginning stage of the development of a problem diagnosis model. The parsed document information provided to data store 632 can (for example) become part of the knowledge base that can be used to answer questions input via portal 620. The parsed document information provided can (for example) thus assist in the development of the aforementioned problem diagnosis model. The Q&A knowledge base 632 output is provided to contextual knowledgebase mapper 636. The mapper 636 maps or correlates IoT context data or information from IoT context model 640, with a problem diagnosis knowledge-based graph (also referred to as a knowledge graph) generated by an IoT knowledge graph generator 644. Some embodiments of IoT context model 640 are similar to the IoT contextual model 456 of FIG. 6 and/or the IoT Context model 432 depicted in FIG. 7.

Referring again to FIG. 8, in some embodiments, one or more knowledge graphs (320, FIG. 7) can also be stored in IoT based knowledge database 648 in addition to being communicated to mapper 636. In some embodiments, the IoT context model 640 can be built or provided with IoT context information from the IoT context creator 604.

In some embodiments, the mapper 636 performs step operation 212 of FIG. 4, e.g., the mapper 636 can link, combine together, or generate ("map") relationships between IoT contexts or context information and the problem diagnosis knowledge graphs. The mapped or linked data or information can be provided back to the dialog engine 616 to assist the user in real time in the problem diagnosis and solution process.

Figure 9:
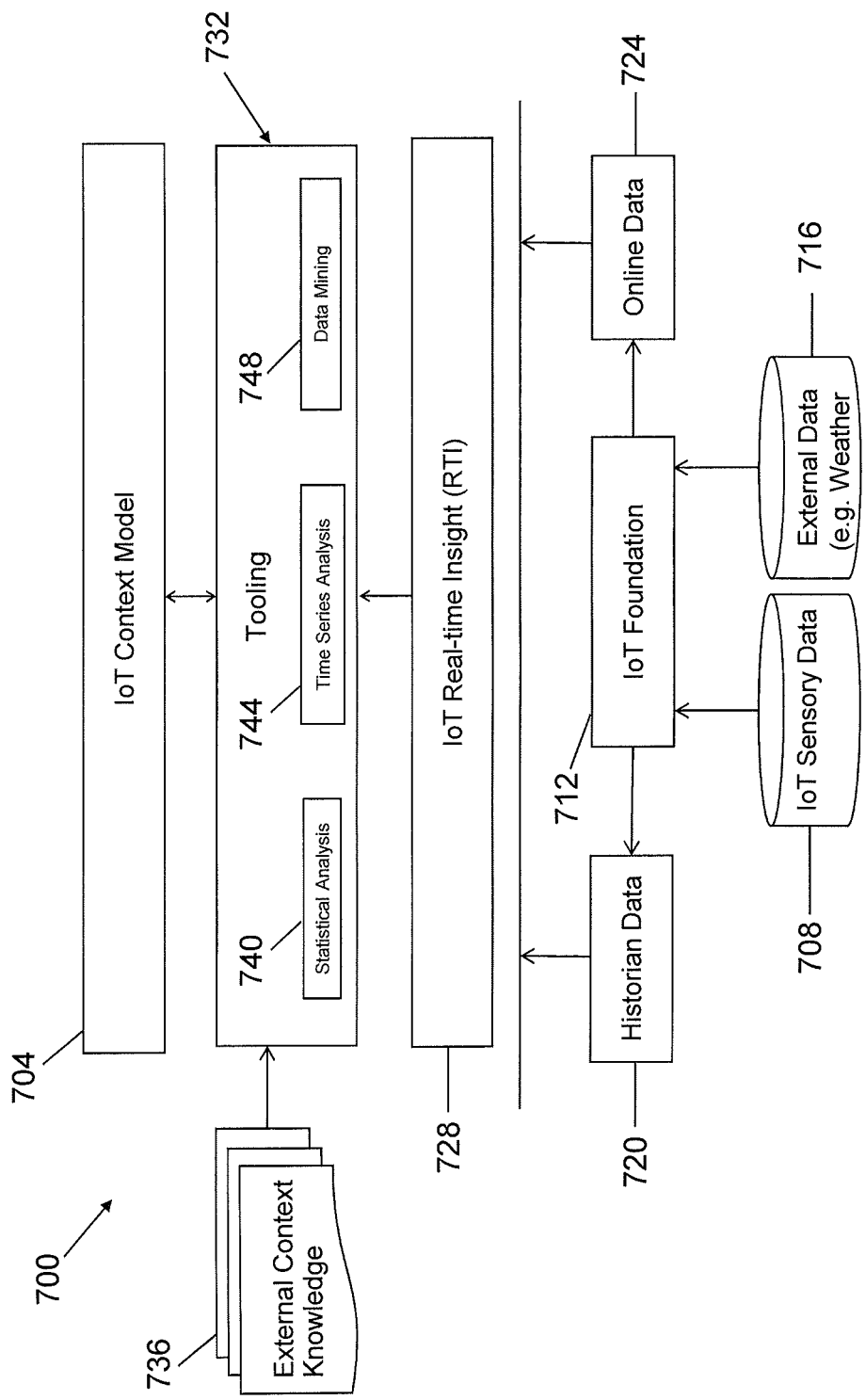
FIG. 9 is a block diagram illustrating the generation of an IoT context model in accordance with one or more embodiments of the present invention.

FIG. 9 depicts an exemplary architecture 700 in accordance with one or more embodiments of the present invention. In some embodiments, architecture 700 can generate an IoT context model 704, which can be similar to (or the same as) the IoT context model 456 shown in FIG. 6, the IoT context model 432 shown in FIG. 7, or the IoT context model 640 shown in FIG. 8.

The example architecture 700 of FIG. 9 includes an IoT foundation function 712. Data store 708 contains IoT sensory data provided (e.g., streamed) from sensors associated with a device (e.g., car 54N of FIG. 1). In this example, the sensors are associated with devices and objects 308 (FIG. 5) of IoT platform 304. As depicted in FIG. 9, the sensory data is provided to an IoT foundation function 712. In some embodiments, the IoT foundation function 712 also receives externally sourced relevant data, such as weather or other information contained in one or more data store(s) 716. The IoT foundation function 712 catalogs the data and provides it to a historian data 720 component and online data 724 component, one or both of which may contain other information relevant to the device at issue (e.g., car 54N of FIG. 1).

Some or all of the information in data stores 720 and 724 are provided by the historian data 720 and online data 724 components to IoT real time insight (RTI) function 728 which is configured to determine (in real-time) the nature of any or all of the data provided. The output of RTI function 728 is provided to Tooling function 732. Available external context knowledge 736 can also be provided to the IDE tooling function 732. Tooling function 732, applies one or more analytics processes to the data. Exemplary analytics processes include (without limitation) statistical analysis 740, time series analysis 744, and/or data mining analysis 748. Other types of analytics include (without limitation) machine learning and cognitive analysis. The analytics may include an ontology-based model.

The analytics of Tooling function 732 create and/or associate context (as required and/or appropriate) to the various types of data, including (without limitation) raw IoT sensor data (streaming in real-time), SME knowledge, and/or information contained in unstructured or semi-structured manuals and maintenance service records. Some of the data may be stored (at least temporarily) and forwarded and/or provided in a batch-mode. An IoT context model 704 is output by Tooling function 732. A more specific example of an IoT context model was described above with reference to FIG. 6 (see IoT context model 456).

Embodiments of the present invention represent an improvement to the IoT. The IoT is relatively new and, as such, has various technical areas that would benefit from further development. One area is the provision or addition of context to raw data from a device or object. Benefits include increasing the level of knowledge about the device or object and providing the device or object with the capability of making certain decisions autonomously. This can improve the speed and quality of diagnosis and prediction of problems with the device or object.

Embodiments of the invention are not limited to IoT domains or problems as explicitly described herein. Other domains or problems are contemplated by various other embodiments of the invention. Also, predictive maintenance of a device or object in an IoT configuration is but a subset of problem that embodiments of the present invention solve. More generalized or generic scenarios exist that require diagnosis, and are thus suitable for various embodiments of present invention.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a memory having program instructions stored therein;
    a processor in communication with the memory, the program instructions when executed by the processor, causing the system to:
        receive diagnostic data associated with a device;
        analyze the diagnostic data to determine a knowledge base associated with the device;
        obtain knowledge base data from the knowledge base for the device based on the diagnostic data;
        operate one or more communicatively coupled objects associated with the device to obtain object data associated with the device based on the diagnostic data and the knowledge base data;
        provide context information for the object data based on the diagnostic data and the knowledge base data;
        map the context information to one or more nodes of a knowledge graph;
        diagnose a problem with the device based on knowledge graph information; and
        provide a resolution to the problem based on knowledge graph information.

2. The system of claim 1, wherein the program instructions causing the system to map the context information to one or more nodes of a knowledge graph, further comprises the program instructions causing the system to cognitively analyze the context information.

3. The system of claim 2, wherein objects are configured as an internet of things (IoT), and wherein the program instructions causing the system to analyze the context information further comprises the program instructions causing the system to generate a context model; and wherein the diagnostic data includes unstructured data relating to one or more IoT objects.

4. The system of claim 3, wherein the program instructions causing the system to receive data from one or more communicatively coupled objects further comprises the program instructions causing the system to receive data from one or more sources external to the device; and wherein the program instructions causing the system to analyze the context information further comprises the program instructions causing the system to analyze the received data from the one or more sources external to the device.

5. The system of claim 1, wherein the program instructions causing the system to map the context information to one or more nodes of a knowledge graph, further comprises the program instructions causing the system to extract missing node context information; and to add the missing node context information to the knowledge graph.

6. The system of claim 1, further comprising the program instructions causing the system to provide a portal and dialog engine adapted to communicate the context information from and to a user device.

7. The computer system of claim 1, wherein the processor is located in a cloud computing environment, and wherein the program instructions are implemented in software run by the processor located in the cloud computing environment.

8. A computer program product comprising:
    a non-transitory storage medium readable by a processing circuit and storing instructions for execution by the processing circuit for performing a method comprising:
    receiving diagnostic data associated with a device;
    analyzing the diagnostic data to determine a knowledge base associated with the device;
    obtaining knowledge base data from the knowledge base for the device based on the diagnostic data;
    operate one or more communicatively coupled objects associated with the device to obtain object data associated with the device based on the diagnostic data and the knowledge base data;
        providing context information for the object data based on the diagnostic data and the knowledge base data;
        mapping the context information associated with the received data to one or more nodes of a knowledge graph;
        diagnosing a problem with the device based on knowledge graph information; and
        providing a resolution to the problem based on knowledge graph information.

9. The computer program product of claim 8, wherein said mapping the context information to one or more nodes of a knowledge graph, further comprises cognitively analyzing the context information.

10. The computer program product of claim 9, wherein objects are configured as an internet of things (IoT), and said analyzing the context information further comprises generating a context model; and wherein the diagnostic data includes unstructured data relating to one or more IoT objects.

11. The computer program product of claim 10, wherein said receiving data from one or more communicatively coupled objects further comprises receiving data from one or more sources external to the device; and said analyzing the context information further comprises analyzing the received data from the one or more sources external to the device.

12. The computer program product of claim 8, wherein said mapping the context information to one or more nodes of a knowledge graph, further comprises: extracting missing node context information; and adding the missing node context information to the knowledge graph.

13. The computer program product of claim 8, wherein the processing circuit is located in a cloud computing environment, and wherein the program instructions are implemented in software run by the processing circuit located in the cloud computing environment.

* * * * *